(12) United States Patent
Holdsworth

(10) Patent No.: US 10,798,186 B2
(45) Date of Patent: Oct. 6, 2020

(54) DYNAMIC GENERATION OF NETWORK ROUTING CONFIGURATION WITH SERVICE REQUIREMENTS

(71) Applicant: INTERNATIONAL BUSINESS MACHINES CORPORATION, Armonk, NY (US)

(72) Inventor: Simon A. Holdsworth, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 538 days.

(21) Appl. No.: 15/177,673

(22) Filed: Jun. 9, 2016

(65) Prior Publication Data

US 2017/0359424 A1 Dec. 14, 2017

(51) Int. Cl.
G06F 15/173 (2006.01)
H04L 29/08 (2006.01)
H04L 12/725 (2013.01)

(52) U.S. Cl.
CPC ............ *H04L 67/16* (2013.01); *H04L 45/306* (2013.01); *H04L 67/10* (2013.01)

(58) Field of Classification Search
CPC ........ H04L 67/16; H04L 45/306; H04L 67/10
USPC .......................... 709/220, 223, 224, 226, 245
See application file for complete search history.

(56) References Cited

U.S. PATENT DOCUMENTS

| | | | |
|---|---|---|---|
| 7,668,934 | B2 | 2/2010 | Flurry et al. |
| 7,689,430 | B2 | 3/2010 | Fremantle et al. |
| 7,689,907 | B2 | 3/2010 | Sankar |
| 8,386,577 | B2 | 2/2013 | Hickson et al. |
| 8,670,320 | B2 | 3/2014 | Eswaran |
| 8,959,246 | B2 | 2/2015 | Holdsworth et al. |
| 9,043,487 | B2 | 5/2015 | Retana et al. |

(Continued)

OTHER PUBLICATIONS

Dadgar, Armon, "HAProxy with Consul", HashiCorp, https://www.hashicorp.com/blog/haproxy-with-consul.html, Aug. 11, 2014 (6 pages).

(Continued)

*Primary Examiner* — Kaylee J Huang
(74) *Attorney, Agent, or Firm* — Alexander Jochym, Esq.; Kevin P. Radigan, Esq.; Heslin Rothenberg Farley & Mesiti P.C.

(57) ABSTRACT

Automated generation and implementation of a network routing configuration with service requirements are provided by automatically establishing a network routing configuration for use in network routing a client request to an appropriate service of a plurality of services of a computing environment. The network routing configuration includes one or more respective instructions to be implemented by the network routing for the appropriate service. The instruction(s) are specified as part of the automatically establishing from one or more tags associated with the appropriate service. Each tag identifies a service requirement of the appropriate service to be implemented by the network routing on behalf of the appropriate service. The network routing executes the one or more instructions associated with the appropriate service in the network routing configuration after receipt of the client request to ensure that the service requirement(s) of the appropriate service is implemented with respect to the client request.

14 Claims, 9 Drawing Sheets

(56) References Cited

U.S. PATENT DOCUMENTS

| | | | |
|---|---|---|---|
| 9,781,028 | B2 | 10/2017 | Ohnishi et al. |
| 10,069,720 | B2 | 9/2018 | Varvello et al. |
| 10,097,521 | B2 | 10/2018 | Wood |
| 2002/0174247 | A1 | 11/2002 | Shen |
| 2007/0274285 | A1 | 11/2007 | Werber et al. |
| 2011/0276695 | A1* | 11/2011 | Maldaner .............. G06F 9/5083 709/226 |
| 2012/0102179 | A1* | 4/2012 | Qiu ....................... G06Q 30/06 709/223 |
| 2012/0297073 | A1* | 11/2012 | Glover .................. G06F 9/5072 709/226 |
| 2015/0180996 | A1* | 6/2015 | Mastrangelo ....... G06F 11/3419 709/217 |
| 2016/0212050 | A1* | 7/2016 | Yin ......................... H04L 45/08 |
| 2018/0081703 | A1* | 3/2018 | Inamdar ................ G06F 17/248 |

OTHER PUBLICATIONS

Spachos et al., "Evaluating the Impact of Next Node Selection Criteria on Quality of Service Dynamic Routing", IEEE International Conference on Communications (ICC), Jun. 10-14, 2014 (pp. 1767-1772).

"Configuring Dynamic Network Element Routing", Oracle Communications ASAP Cartridge Development Guide Release 7.2, http://docs.oracle.com/cd/E18887_01/html/e22486/cart_dev_dynamic_routing.htm, downloaded Feb. 11, 2016 (16 pages).

\* cited by examiner

SERVICE REGISTRY

```
"service": {
  "name": "test-service",
  "tags": [ "terminate-https","basic-auth","limit-client-rate" ],
  "nodes": [
    {"Node": "node1", "NodeAddress": "10.0.0.15", "Port": 7443 },
    {"Node": "node2", "NodeAddress": "10.0.0.16", "Port": 7443 }
  ]
}
```

FIG. 7A

CONFIGURTION TEMPLATE

```
//      Text inside {{...}} is an instruction to the template engine, rest is config statements
//      Filter to only include services with "terminate-https" tag
{{$term_services := (index (services | byTag) "terminate-https")}}
frontend term
   rspidel ^(Server): // Remove these HTTP headers in all responses
{{range $a:=$term_services}} // Generate configuration for each of these services
   // Match the service name with ".test.org" added to the SSL SNI header
   acl host_match_{{$a.Name}} ssl_fc_sni -i {{$a.Name}}.test.org
   use_backend b_term_{{$a.Name}} if host_match_{{$a.Name}}
{{end}}
{{range $a:=$term_services}} // Generate a backend for each of these services
backend b_term_{{$a.Name}}
{{if $a.Tags.Contains "limit-client-rate"}}   // Add QOS for "limit-client-rate" tag
   acl too_many_req be_sess_rate gt 1000    // Reject client requests above this rate
   tcp-request content reject if too_many_req{{end}}
{{if $a.Tags.Contains"basic-auth"}}        // Add QOS for "basic-auth" tag
   acl is_auth http_auth(ul_{{$a.Name}})      // Check valid userId and password
   http-request auth realm iiboc if !is_auth{{end}}
// ... more instructions to generate a "server" statement for each node of this service...
{{end}}
```

FIG. 7B

NETWORK ROUTING CONFIGURATION

```
frontend term
  rspidel ^(Server): // Remove these HTTP headers in all responses
  // Match the service name with ".test.org" added to the SSL SNI header
  acl host_match_test-service ssl_fc_sni -i test-service.test.org
  use_backend b_term_test-service if host_match_test-service backend b_term_test-service
  acl too_many_req be_sess_rate gt 1000      // Reject client requests above this rate
  tcp-request content reject if too_many_req
  acl is_auth http_auth(ul_test-service)      // Check valid userId and password
  http-request auth realm testorg if !is_auth
  server node_node1 10.0.0.15:7443 check ssl verify required
  server node_node2 10.0.0.16:7443 check ssl verify required
```

FIG. 7C

CONFIGURTION TEMPLATE

```
  # If service tagged with "persistent-session" defined a cookie which is added to responses
  {{if $a.Tags.Contains "persistent-session"}}
  cookie RouteID insert indirect nocache domain .{{$domain}} maxidle 60m
  {{end}}

# Generate a server entry for each node that supports this service.
  # If the service is tagged with "persistent-session" configure the servers to be selected based on the cookie.
  {{range $n:=service $a.Name}}
  server node_{{$n.Node}} {{$n.NodeAddress}}:80 {{if $a.Tags.Contains "persistent-session"}}cookie node_{{$n.Node}}{{end}}
  {{end}}
```

DYNAMIC GENERATION OF NETWORK ROUTING CONFIGURATION WITH SERVICE REQUIREMENTS

BACKGROUND

In service-oriented architectures, a fundamental premise is the reuse of service applications that may be offered across, for instance, the Internet, and that are built using standard technologies that allow inter-operability between systems and applications. By way of example, a web or cloud service may be invoked by a client application to perform an extended function not otherwise available to the client itself. In one or more examples, the client may be an enterprise application and associated enterprise system that are clients of the services being invoked. Today, web services are more frequently referred to as "cloud" services as cloud computing has become more pervasive. Generally, a cloud service is any resource that is provided over the Internet. The most common cloud service resources are software as a service (SaaS), platform as a service (PaaS), and infrastructure as a service (IaaS). Advantageously, cloud services are designed to provide easy, scalable access to applications, resources, and services, and are fully managed by a cloud services provider.

Cloud computing, or on-demand computing, provides shared processing resources and data to computers and other devices on-demand. For a client, the network elements representing the provider-rendered services are typically invisible, with requests being forwarded from one or more clients via network routing of the cloud computing environment to one or more services or service providers within the computing environment.

SUMMARY

Shortcomings of the prior art are overcome and additional advantages are provided through the provision of a computer program product facilitating automated generation of a network routing configuration with service requirements to be implemented by network routing. The computer program product comprises a computer-readable storage medium having program instructions embodied therewith, the program instructions being executable by a processor to perform a method. The method includes, for instance, automatically establishing a network routing configuration for use in network routing a client request to an appropriate service of a plurality of services of a computing environment, the network routing configuration including one or more respective instructions to be implemented by the network routing for the appropriate service of the plurality of services, the one or more instructions being specified as part of the automatically establishing from one or more tags associated with the appropriate service, each tag identifying a service requirement of the appropriate service to be implemented by the network routing on behalf of the appropriate service; and executing, by the network routing, the one or more instructions associated with the appropriate service in the network routing configuration after receipt of the client request to ensure that the service requirement(s) of the appropriate service is implemented with respect to the client request.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

FIG. 7A depicts an example service registry identifying a service within a computing environment and one or more tags associated with the service, in accordance with one or more aspects of the present invention;

FIG. 7B depicts a partial embodiment of a configuration template to be referenced by a configuration generator when generating (for instance, updating) a network routing configuration, in accordance with one or more aspects of the present invention;

FIG. 7C depicts a partial embodiment of a network routing configuration, in accordance with one or more aspects of the present invention; and FIG. 8 depicts another partial embodiment of a configuration template to be referenced by a configuration generator when generating (for instance, updating) a network routing configuration, in accordance with one or more aspects of the present invention.

DETAILED DESCRIPTION

One or more aspects of the present invention provided herein comprise a facility which allows for automated generation of a network routing configuration with service requirements specified via one or more instructions to be executed by network routing on behalf of a service provider of the computing environment. For instance, the network routing configuration may include one or more respective instructions to be implemented by the network routing for an appropriate service of the plurality of services. The one or more instructions may be specified or generated as part of automatically establishing the network routing configuration from one or more tags associated with the appropriate service. Each tag may identify a service requirement of the appropriate service to be implemented by the network routing on behalf of the appropriate service in connection with processing a client request. The network routing executes the one or more instructions associated with the appropriate service in the network routing configuration after receipt of the client request to ensure that the service requirement(s) of the appropriate service is implemented with respect to the client request.

Figure 1:
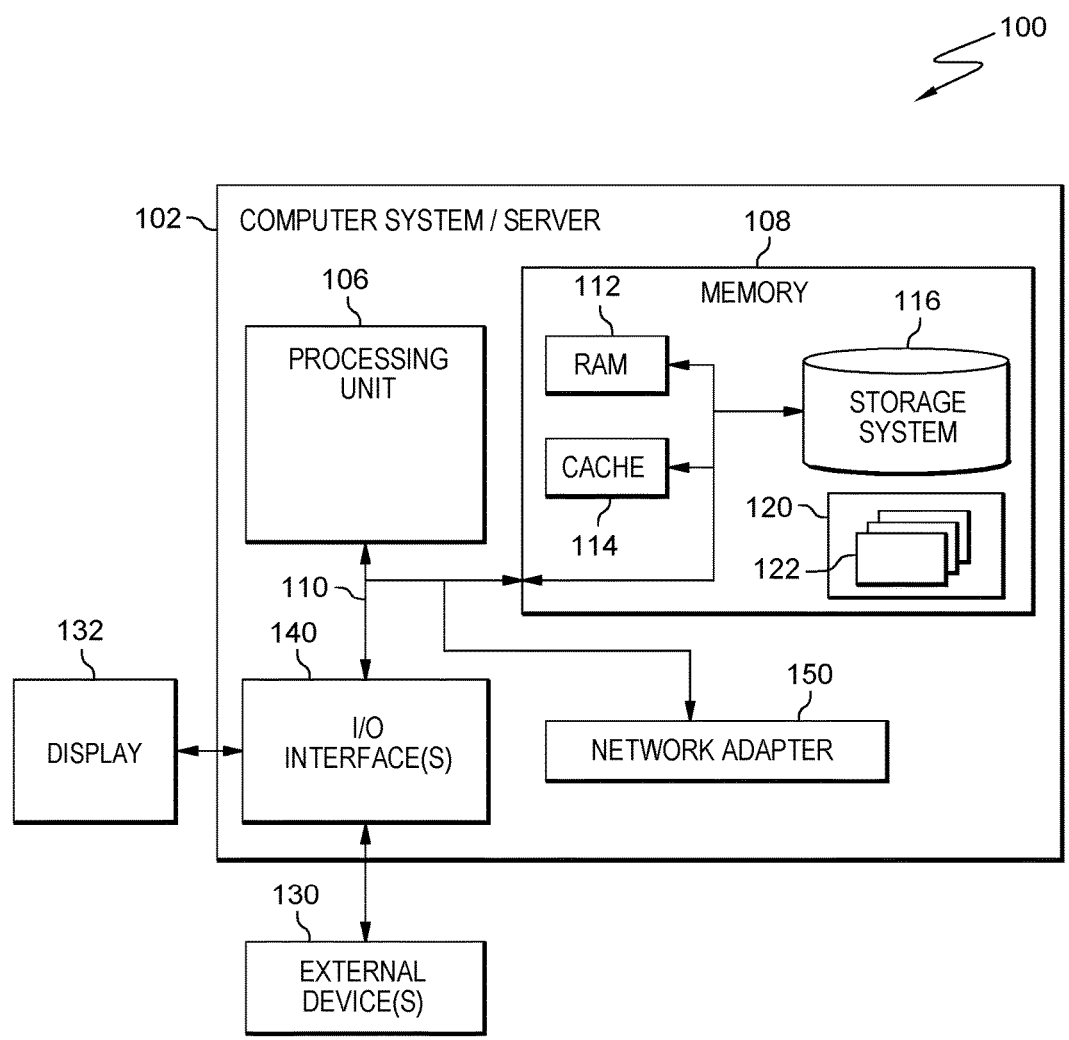
FIG. 1 depicts one example of a computer system/server of a computing environment to incorporate and/or use one or more aspects of the present invention.

One or more embodiments of a computing environment to incorporate and/or use one or more aspects of the present invention and described below with reference to FIGS. 1-4B. Referring first to FIG. 1, in one example, a computing environment 100 includes at least one computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 1, computer system/server 102 is shown in the form of a general-purpose computing device. The components of computer system/server 102 may include, but are not limited to, one or more processors or processing units 106, a system memory 108, and a bus 110 that couples various system components including system memory 108 to processor 106.

In one embodiment, processor 106 is based on the z/Architecture offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 102 typically includes a variety of computer system readable media. Such media may be any available media that is accessible by computer system/server 102, and it includes both volatile and non-volatile media, removable and non-removable media.

System memory 108 can include computer system readable media in the form of volatile memory, such as random access memory (RAM) 112 and/or cache memory 114. Computer system/server 102 may further include other removable/non-removable, volatile/non-volatile computer system storage media. By way of example only, storage system 116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 110 by one or more data media interfaces. As will be further depicted and described below, memory 108 may include at least one program product having a set (e.g., at least one) of program modules that are configured to carry out the functions of embodiments of the invention.

Program/utility 120, having a set (at least one) of program modules 122, may be stored in memory 108 by way of example, and not limitation, as well as an operating system, one or more application programs, other program modules, and program data. Each of the operating system, one or more application programs, other program modules, and program data or some combination thereof, may include an implementation of a networking environment. Program modules 122 generally carry out the functions and/or methodologies of embodiments of the invention as described herein.

Computer system/server 102 may also communicate with one or more external devices 130 such as a keyboard, a pointing device, a display 132, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 140. Still yet, computer system/server 102 can communicate with one or more networks such as a local area network (LAN), a general wide area network (WAN), and/or a public network (e.g., the Internet) via network adapter 150. As depicted, network adapter 150 communicates with the other components of computer system/server 102 via bus 110. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 1. Computer system/server 102 of FIG. 1 may be practiced in distributed cloud computing environments where tasks are performed by remote processing devices that are linked through a communications network. In a distributed cloud computing environment, program modules may be located in both local and remote computer system storage media including memory storage devices. Computer system/server 102 is capable of being implemented and/or performing any of the functionality set forth hereinabove.

Figure 2:
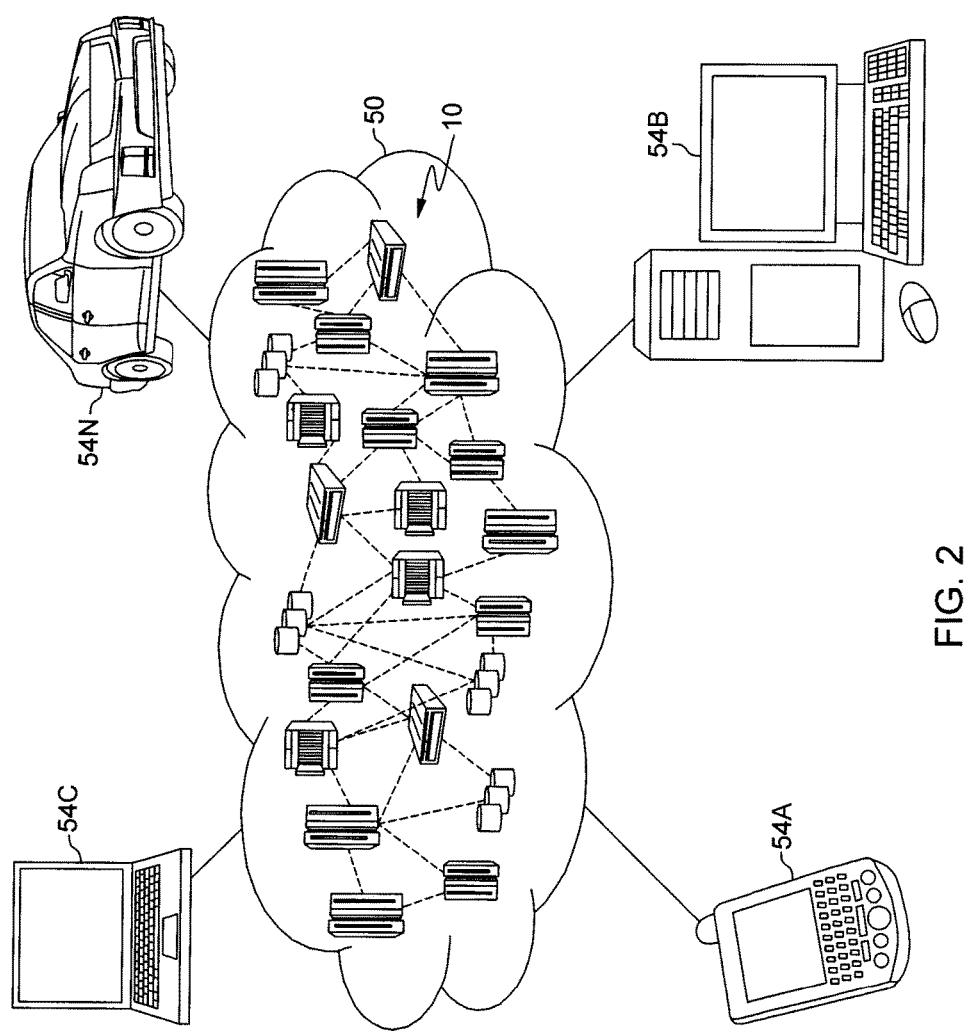
FIG. 2 depicts one embodiment of a cloud computing environment to use one or more aspects of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 3:
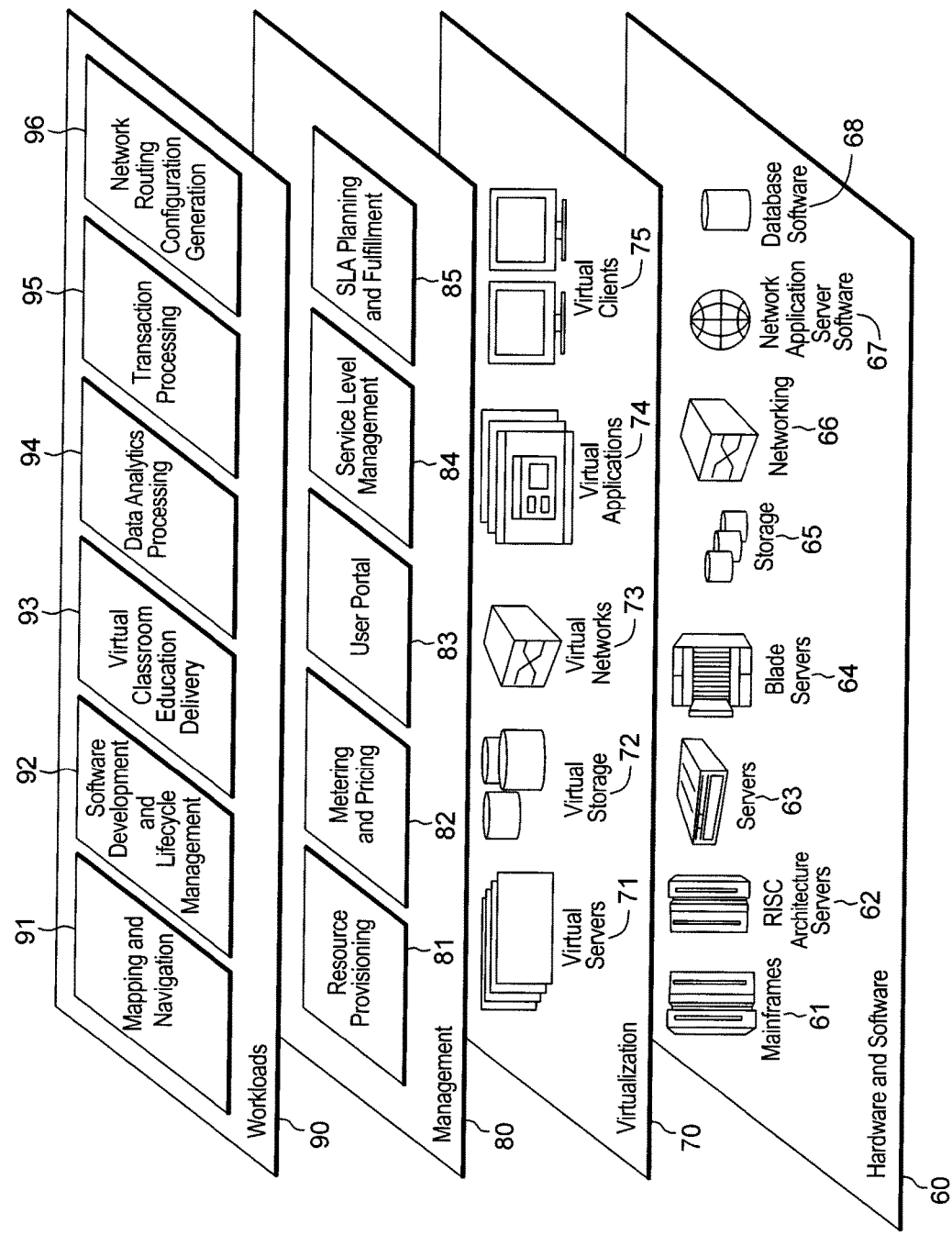
FIG. 3 depicts an example of extraction model layers to use one or more aspects of the present invention.

Referring now to FIG. 3, a set of functional abstraction layers provided by cloud computing environment 50 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Network Routing Configuration Generation 96.

Figure 4A:
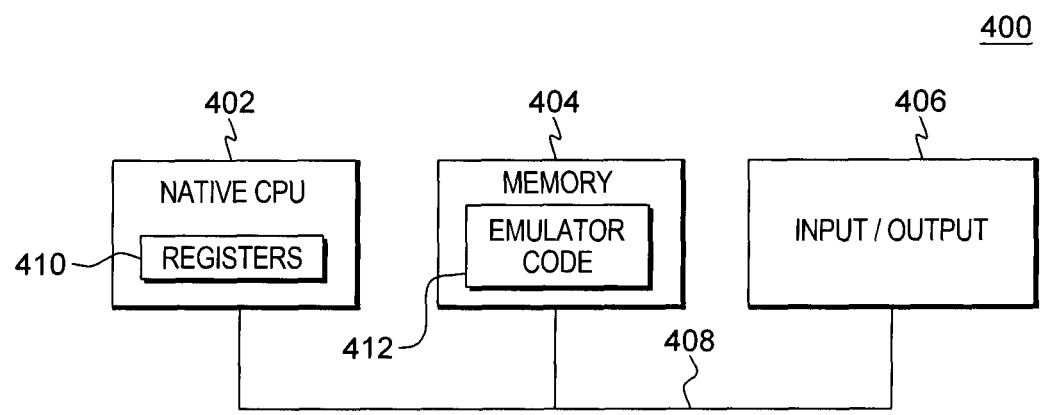
FIG. 4A depicts another example of a computing environment to incorporate and/or use one or more aspects of the present invention.

Another embodiment of a computing environment which may incorporate and use one or more aspects is described with reference to FIG. 4A. In this example, a computing environment 400 includes, for instance, a native central processing unit 402, a memory 404, and one or more input/output devices and/or interfaces 406 coupled to one another via, for example, one or more buses 408 and/or other connections. As examples, computing environment 400 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 402 includes one or more native registers 410, such as one or more general purpose registers and/or one or more special purpose registers used during processing within the environment. These registers include information that represents the state of the environment at any particular point in time.

Moreover, native central processing unit 402 executes instructions and code that are stored in memory 404. In one particular example, the central processing unit executes emulator code 412 stored in memory 404. This code enables the processing environment configured in one architecture to emulate another architecture. For instance, emulator code 412 allows machines based on architectures other than the Power architecture, such as zSeries servers, pSeries servers, HP Superdome servers or others, to emulate the Power architecture and to execute software and instructions developed based on the Power architecture. In a further example, emulator code 412 allows machines based on architectures other than the z/Architecture®, such as PowerPC processors, pSeries servers, HP Superdome servers or others, to emulate the z/Architecture® and to execute software and instructions developed based on the z/Architecture®. Other architectures may also be emulated.

Figure 4B:
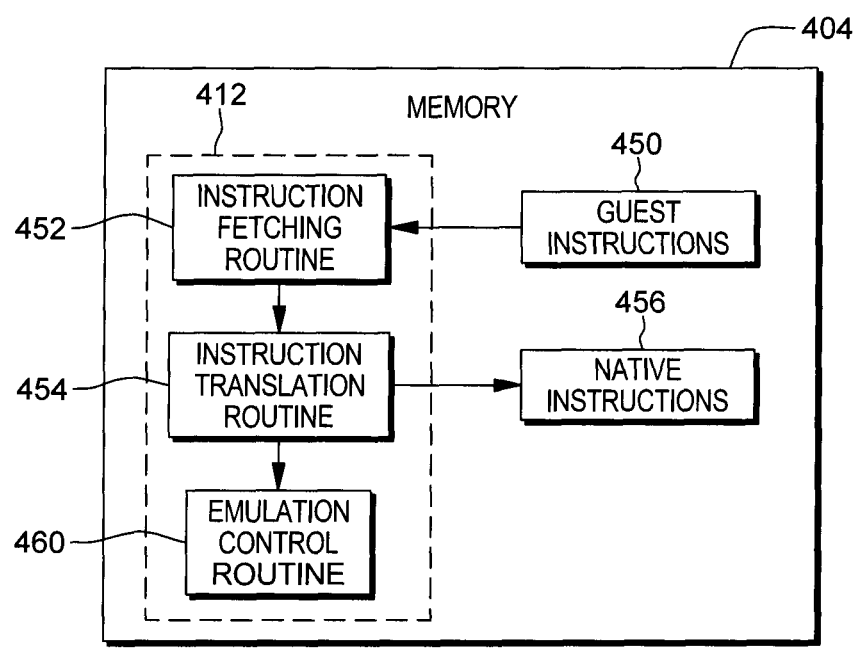
FIG. 4B depicts further details of the memory of FIG. 4A.

Further details relating to emulator code 412 are described with reference to FIG. 4B. Guest instructions 450 stored in memory 404 comprise software instructions (e.g., correlating to machine instructions) that were developed to be executed in an architecture other than that of native CPU 402. For example, guest instructions 450 may have been designed to execute on a PowerPC processor or a z/Architecture® processor, but instead, are being emulated on native CPU 402, which may be, for example, an Intel Itanium II processor. In one example, emulator code 412 includes an instruction fetching routine 452 to obtain one or more guest instructions 450 from memory 404, and to optionally provide local buffering for the instructions obtained. It also includes an instruction translation routine 454 to determine the type of guest instruction that has been obtained and to translate the guest instruction into one or more corresponding native instructions 456. This translation includes, for instance, identifying the function to be performed by the guest instruction and choosing the native instruction(s) to perform that function.

Further, emulator code 412 includes an emulation control routine 460 to cause the native instructions to be executed. Emulation control routine 460 may cause native CPU 402 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 456 may include loading data into a register from memory 404; storing data back to memory from a register; or performing some type of arithmetic or logic operation, as determined by the translation routine.

Each routine is, for instance, implemented in software, which is stored in memory and executed by native central processing unit 402. In other examples, one or more of the routines or operations are implemented in firmware, hardware, software or some combination thereof. The registers of the emulated processor may be emulated using registers 410 of the native CPU or by using locations in memory 404. In embodiments, guest instructions 450, native instructions 456 and emulator code 412 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

As noted initially, from the client perspective, network elements representing provider-rendered services in a multiservice computing environment may typically be invisible, with client requests being forwarded via network routing logic of the computing environment, to one or more services or service providers within the computing environment. Also, in a dynamic, multi-tenant computing environment, services, such as service provider application programs or logic, may be provided, each with different service requirements or qualities of services. During operation, services may come and go from the computing environment. Advantageously, in accordance with one or more aspects of the present invention, the routing infrastructure is dynamically reconfigured for the specific changes. For instance, in a software as a service (SaaS) environment, this is may be advantageously performed in an automated manner, such that the configuration is based on a current set of services being provided within the computing environment (which as noted, may change dynamically over time, for instance, based on client or user actions).

Generally stated, approaches are disclosed herein for automatically, dynamically generating a network routing configuration with service requirements of the services in the computing environment. The network routing configuration includes one or more respective instructions embodying decision logic to be performed by the routing network on behalf of an appropriate service of the plurality of services of the computing environment. The one or more instructions may be generated, as part of the automatically establishing of the network routing configuration, from one or more tags, metadata, indications of required services, etc., associated with the appropriate service, and identified, for instance, in a service registry identifying initiated instances of a plurality of services or service providers of the computing environment. For instance, each tag in the service registry may identify for the associated service one or more service requirements or qualities of service to be implemented by network routing on behalf of that service. By way of example, the one or more service requirements may comprise, for instance, authentication services, persistent session services, or other functionality, or routing-related logic, to be implemented by network routing on behalf of the service. These one or more service requirements to be implemented by network routing for a service include higher-level behaviors or logic that may control, for instance, the way connections and messages are handled for the service, including, augmentation, validation, redirection, or rejection of a client request, and are distinct from simple filtering or selection of a service version.

After receipt of a request to access an appropriate service, the network routing executes the one or more instructions associated with the appropriate service to ensure that the service requirement(s) of the appropriate service in the network routing configuration is implemented with respect to that request. This may include (for instance) forwarding, by the network routing, the client request to the appropriate service, after the service requirement(s) for the appropriate service has been implemented by network routing, and network routing determines that the client request should be forwarded. Otherwise, the client request may be rejected, or network routing may require a client forwarding the request to provide additional information in order to process the one or more routing logic instructions associated with the desired service, that is, embodying the service requirement(s) for that service.

In one or more implementations, the plurality of services of the computing environment may include a plurality of service application programs, or logic, and the computing environment itself may be a cloud computing environment, with the network routing being a network routing component, program, logic, etc., which references the network routing configuration, and ensures that the service requirement(s) of the appropriate service is implemented with respect to a received client request.

In one or more embodiments, automatically establishing the network routing configuration may include referencing a service registry, with each instance of a service of the plurality of services of the computing environment registering with the service registry when started, and the service registry including for the appropriate service, one or more tags indicative of the service requirement(s) of the appropriate service to be implemented by the network routing on behalf of the appropriate service. The automatically establishing of the network routing configuration may further include dynamically generating the network routing configuration for the plurality of services of the computing environment referencing the service registry, as well as a configuration template, or configuration template document. By way of specific example, the service registry may be provided on a Consul open source infrastructure, and the configuration template may be provided by a Consul template application, which facilitates querying the service registry and generating the network routing configuration based on the tags in the service registry associated with the plurality of services. The routing logic may be provided based on a variety of components, such as a HAProxy infrastructure, an nginx infrastructure, a Datapower infrastructure, etc.

In one or more implementations, the plurality of services of the computing environment dynamically change over time, and the automatically establishing includes dynamically revising or updating the network configuration document based on the one or more changes to the plurality of services of the computing environment.

By way of specific example, the one or more tags associated with the appropriate service may include a persistent session tag, and the network routing may automatically add a cookie to a response by the appropriate service to the request being returned to a client initiating the request, with the cookie facilitating maintaining the persistent session when one or more additional client requests are received from the client for the appropriate service. As another example, the one or more tags associated with the appropriate service may include an authentication tag, where the network routing automatically authenticates (for instance, via a user ID and password) a client sending the request before forwarding the client request to the appropriate service. This routing logic may include, for instance, querying the client for additional information should the user ID and/or password be missing or incomplete. Further, note that implementing the service requirement may entail rejecting a client request at the network routing should, for instance, authentication fail if authentication is a specified service requirement of the appropriate service of the computing environment.

Figure 5:
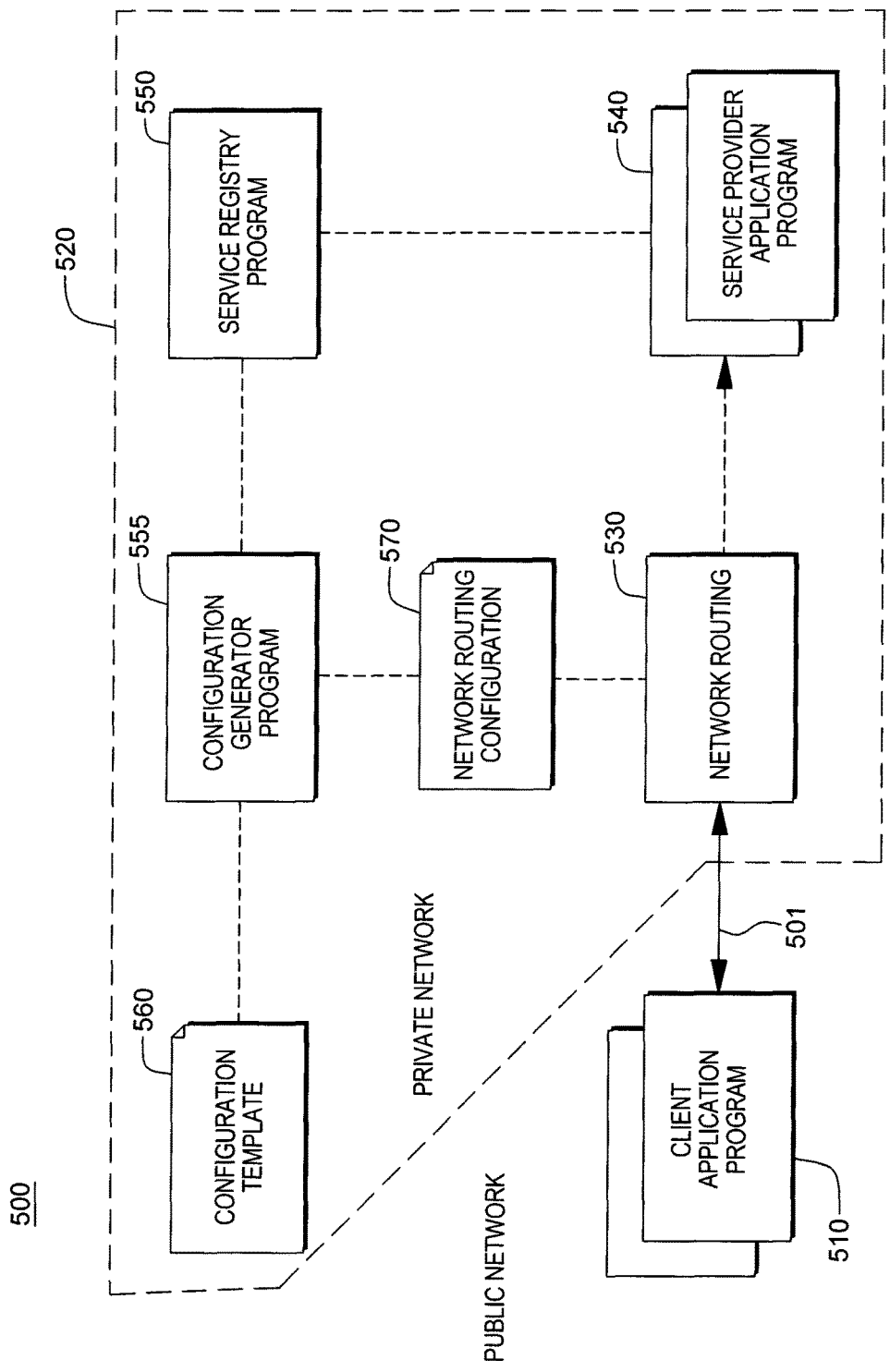
FIG. 5 depicts one embodiment of a computing environment, to incorporate and/or use one or more aspects of the present invention.

FIG. 5 depicts one embodiment of a computing environment 500, such as a cloud computing environment, implementing one or more aspects of the present invention. In this embodiment, one or more clients 510, such as client application programs, communicate across a public network 501, such as the Internet, with a private network 520 providing one or more services accessible by clients 510. As shown, private network 520 may include network routing 530, such as a network routing program or programs, as well as one or more services 540, such as service-provider applications or service-provider application programs. By way of example, the one or more services 540 may be software as a service (SaaS) resources, which provide services to be accessed over one or more computer networks at, for instance, respective private addresses within private network 520. Network routing 530, which as noted, may also be a software component, provides one or more publicly accessible network addresses, and enables access to the services 540 or service providers by forwarding requests and responses between clients 510 and the services 540.

As noted, clients 510 may be software components which access services 540 over one or more networks, such as public network 501, or may themselves be part of, for instance, private network 520, in another embodiment. By way of specific example, client 510 may be any of a wide variety of programs or systems, such as a web browser, a workstation, a JAVA Script running on a web page, etc., that make a request for a service. Alternatively, client 510 might be another service provider of the computing network that needs another service as part of its processing, etc. Clients 510 do not generally interact directly with services 540, but rather interact with network routing 530. Network routing 530 manages communication between clients 510 and service providers 540. The network routing, as well as the services 540, may be running on any underlying server or system, such as any of the servers or systems referenced above.

As further illustrated in FIG. 5, private network 520 may include, in the depicted implementation, a service registry 550 (such as a service registry program), a configuration generator 555 (such as a configuration generator program), a configuration template 560 (or electronic template document), and a network routing configuration 570. The network routing configuration is, in one or more implementations, an electronic configuration document that is dynamically generated by configuration generator 555, based on information in service registry program 550, using configuration template 560.

Figure 6A:
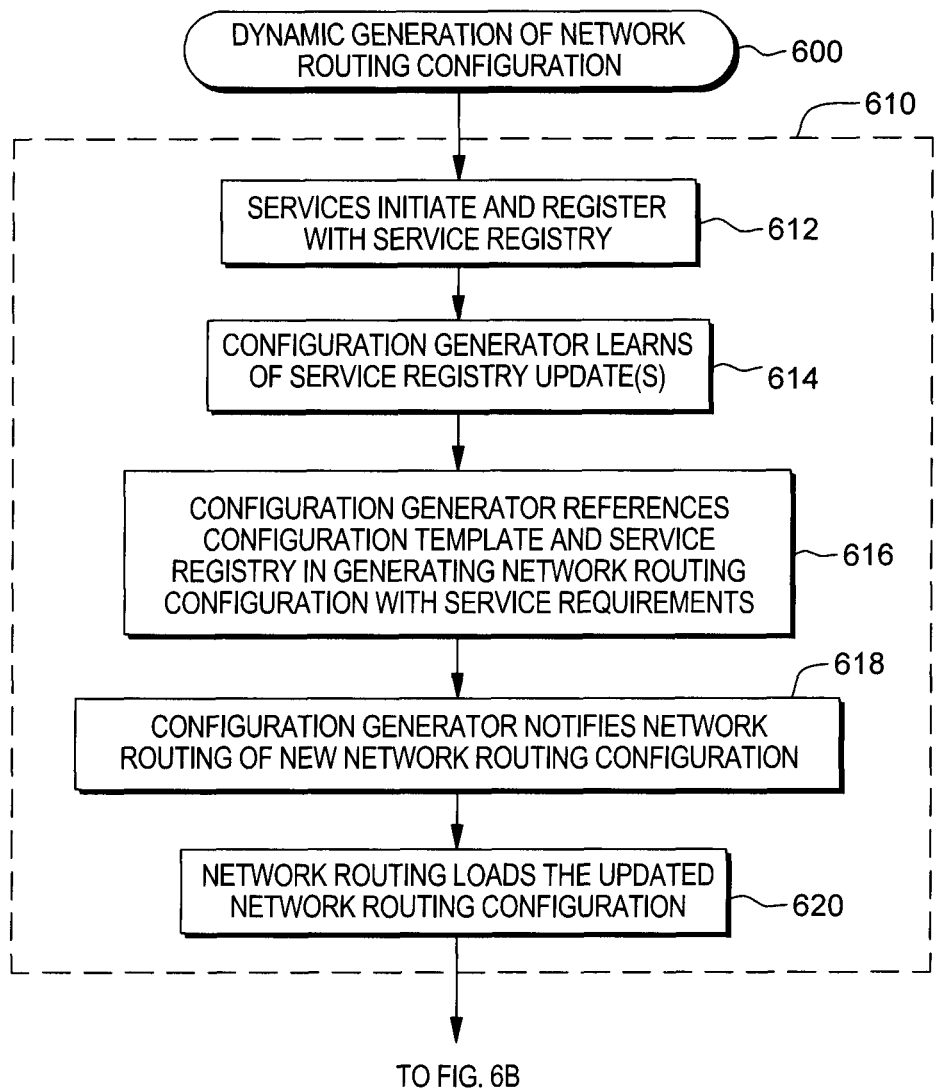
FIGS. 6A-6B depict one embodiment of a process for dynamically generating a network routing configuration and using the network routing configuration in implementing by network routing one or more service requirements of a service, in accordance with one or more aspects of the present invention.
Figure 6B:
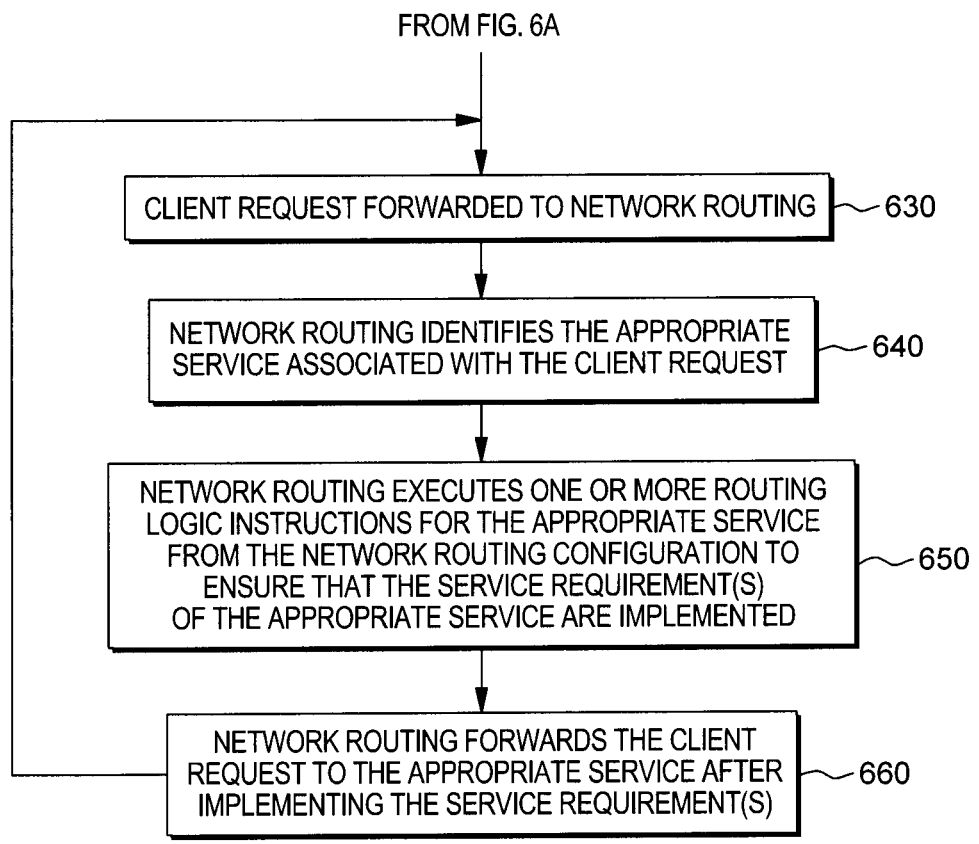

By way of further explanation, FIGS. 6A & 6B depict one embodiment for dynamically generating and using an updated network routing configuration, in accordance with one or more aspects of the present invention.

Referring first to FIG. 6A, dynamic generation of a network routing configuration 600 may include automatically establishing a network routing configuration 610 for use in network routing a client request to an appropriate service of a plurality of services of the computing environment. This automatically establishing of the network configuration 610 may include one or more services or instances of services initiating, and registering with the service registry 612 (such as service registry 550 of FIG. 5). As noted, the service registry may be a software component which manages a list of, for instance, active services or service providers, their network addresses, and associated tags or metadata indicative of the quality of services or service requirements to be provided for the services. By way of example only, the service registry may be implemented using an open-source Consul program or infrastructure.

More particularly, the service registry may maintain a database of all known services in the computing environment, their network addresses, and tags indicative of service requirements, as described herein. This information may be provided by each service when each instance of the service, for example, node, is started, and updated when the node changes or stops within the computing environment. An example of a service registration for a service with two nodes and a number of tags is depicted in FIG. 7A.

In operation, a service or service provider application, is initiated or comes on-line, and registers zero or more network addresses or endpoints with the service registry along with zero or more tags indicative of zero or more service requirements or qualities of service to be implemented by the network routing on behalf of the service. As further examples, the tags associated with one or more services in the service registry may specify, for instance, higher-level service requirements or qualities of service, such as:

Require client transmits a valid user ID and password for the service;
Limit client requests to a maximum rate;
Expose service for HTTP access on port 80;
Expose service for HTTPs access on port 443 with server certificate;
Redirect all requests for a service on port 80 to port 443;
Maintain backend server affinity for a service via a cookie; and
Use a custom domain name and server certificate for the service.

Continuing with FIG. 6A, a configuration generator (such as configuration generator 550 of FIG. 5) learns of one or more service registry updates 614. This may be implemented, in one or more embodiments, by the service registry notifying the configuration generator when one or more updates occur or, for instance, by the configuration generator polling the service registry for updates periodically.

The configuration generator references a configuration template (such as configuration template 560 of FIG. 5), as well as the service registry, in generating a network routing configuration with service requirements for the services of the computing environment 616. By way of example, the configuration generator program may be a software component which combines the configuration template document with the current information in the service registry to produce the network routing configuration.

The configuration template provides the means to reconfigure the network routing dynamically, based on information in the service registry. For instance, the configuration template document holds the relationship between tags and routing configuration instructions. The configuration template document can have its logic defined in several ways, such as: a service provider could include the definition of the logic required for the tag, along with its registration, so that the logic is inserted into the configuration template when the configuration is generated, which means that the services could add logic or instructions, which are not known in advance by the routing software; the logic for a tag could be added separately through another channel by providing a mechanism to update the template, and the next time a service is registered in the service registry, that updated logic could be utilized; or, the logic could be predefined in the configuration template, and services may only use tags which correspond to known qualities of service, or service requirements, in the template.

FIG. 7B depicts a partial example of a configuration template, which may be used in accordance with one or more aspects of the present invention. In this example, the configuration template includes items relating to filtering, as well as higher-level functionality, such as adding an authentication requirement based on a tag associated with a service in the service registry.

By way of further explanation, the configuration template may be a network routing configuration document with additional inline instructions on how to generate sections of the routing configuration within it. For instance, instructions may include loops, such as, for example, "include the following configuration for each service"; "generate the following 'server' line for each node of a specific service", etc. The instructions could also be conditional instructions, such as "only generate the following configuration if the service has the 'production' tag". By way of further example, the template document could be, for instance, a Consul-template, which defines or provides the mechanism or infrastructure to reconfigure the network routing configuration dynamically based, at least in part, on information in the service registry.

The configuration generator establishes the network routing configuration, or updated routing configuration, by, for instance, reading and validating the configuration template document. This may include querying the service registry for information (services, tags, nodes) it requires in order to process instructions in the configuration template. The configuration generator processes the instructions in the configuration template to generate the network routing configuration document. Further, when any of the information used by the configuration template changes in the service registry, the configuration generator may be notified to generate a new configuration document.

By way of example, the network routing configuration, or network routing configuration document, electronically defines network routing in terms of, for instance: the network endpoints on which requests are received; the nodes to which requests are to be forwarded for a specific service; and/or configuration statements, which may result in accepted, redirected, or rejected client requests. For example, for each endpoint, a configuration statement may specify how to identify the service being requested, for instance, extract from the SSL "SNI" header. Further, additional configuration statements may be provided that apply to all services, such as "remove HTTP 'server' header on all responses". Also, conditional configuration statements may be provided that apply to specific services, such as "reject request for a given service if no valid certificate was provided". Regarding the nodes to which requests are forwarded for each specific service, additional configuration statements may apply to a particular service, such as "check that the client provided a valid user ID and password for this service", or "check the overall request rate for this service is not exceeding a given limit". Requests may be forwarded onto nodes, as decided by a load balancing scheme. Configuration statements may influence selection of a particular node, however. For instance, based on a specified service requirement, the network routing may extract a value of a cookie associated with the client request, and if present, use the extracted information to select a specific service node, for instance, to maintain a persistent session.

FIG. 7C illustrates a simplified, partial example of a network routing configuration.

Continuing with FIG. 6A, upon updating the network routing configuration, the configuration generator may notify network routing of an updated network routing configuration 618, and network routing may load the updated network routing configuration 620, which may include, for instance, supplying any required routing logic to provide the desired service requirement(s) for the services of the computing environment.

As illustrated in FIG. 6B, operation of the computing environment may include a client request being forwarded to network routing 630. The client request may include a request for an appropriate service of the plurality of services of the computing environment. The network routing identifies the appropriate service associated with the client request 640, and network routing executes one or more routing logic instructions for the appropriate service from the updated network routing configuration to ensure that the service requirement(s) of the appropriate service is implemented 650. Network routing may, for instance, forward the client request to the appropriate service after implementing the service requirement 660, if appropriate. Alternatively, network routing may redirect the client request, or reject the client request depending, for instance, on the service requirement(s) to be implemented by network routing for the appropriate service, and the information associated with the client request received from the client.

By way of specific example, aspects of the present invention may be implemented using, for instance, HAProxy as the routing technology, Consul as the service registry, and Consul-template as the reconfiguration technology. A server, which utilizes a router employing the HAProxy technology also includes a Consul agent, which makes a connection to the Consul service registry. It also may include Consul-template, which is configured to generate an HAProxy configuration file from a template, and reload HAProxy when information in the service registry changes.

Services may register themselves with the Consul server by a local Consul agent, and supply information about their services, which include the service name, address, port, and one or more tags. Multiple servers may register the same service. The Consul agent includes its network address in the service registration so that the Consul server knows the host for each instance of a service, and this information may be used in the router configuration.

In one or more implementations, the Consul service may use a tag to describe versions or locations of a service. The HAProxy configuration template in that case would select which service to be used, based on a specific tag, for example, an HAProxy router running in a production environment might have a configuration generator which only include services that have a "production" tag.

As a further enhancement, a set of tags is defined, which the HAProxy configuration template uses to translate into configuration statements. FIG. 8 illustrates a simplified snippet from an HAProxy configuration template, which shows how a "persistent-session" tag results in configuration of a cookie, that is added to a response back to a client sending a request, and when present in a subsequent request, results in the network routing the subsequent request to the same back-end server instance.

Advantageously, using the concept of tags described herein, functional routing requirements, or logic, may be specified to be performed by network routing when handling a request directed to a service of the environment. In one or more implementations, the set of services of the computing environment, as well as their individual service requirements, do not need to be known in advance. This significantly reduces effort required to maintain a configuration document. Further, conditional statements may be evaluated once the configuration document is generated, and not for every request passing through the network routing. This advantageously reduces the computer processing costs in network routing. Because the configuration template does not have details of specific services, it can be reused for other computing environments. In accordance with one or more aspects, support for a new tag, and corresponding quality of service or service requirement, can be added to a configuration template dynamically. For instance, a service provider could include the definition of the logic required for the tag, along with its registration, or through communication with the configuration generator, so that the logic is inserted into an updated configuration template, and used to generate an updated network routing configuration. Alternatively, the logic for a tag may be added by providing a mechanism to update the configuration template document, and the next time the service is registered with that tag, the logic may be used.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.), can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product facilitating implementation of one or more quality of service requirements of a service provider application program by network routing, the computer program product comprising:

a non-transitory computer-readable storage medium having program instructions embodied therewith, the program instructions being executable by a processor to perform a method comprising:

automatically establishing a network routing configuration for use in routing a client request from a public network to an appropriate service provider application program of a plurality of service provider application programs of a private network, the automatically establishing including generating one or more respective instructions to be executed by the network routing for the appropriate service provider application program of the plurality of service provider application programs, the one or more instructions being generated as part of the automatically establishing from one or more tags associated with the appropriate service provider application program, each tag identifying a quality of service requirement of the appropriate service provider application program to be implemented by the network routing on behalf of the appropriate service provider application program, wherein different service provider application programs of the plurality of service provider application programs of the private network have different quality of service requirements to be executed by the network routing on behalf of the different service provider application programs;

receiving the client request from the public network at the network routing;

identifying, by the network routing, the appropriate service provider application program of the plurality of service provider application programs of the private network;

based on the receiving and the identifying, executing, by the network routing, the one or more instructions associated with the appropriate service provider application program, along with routing the client request to the appropriate service provider application program, ensures that the quality of service requirement(s) of the appropriate service provider application program is implemented with respect to the client request at the network routing; and wherein:

the automatically establishing references a service registry, each instance of a service provider application program of the plurality of service provider application programs registering with the service registry when started, and the service registry including for the appropriate service provider application program, the one or more tags indicative of the quality of service requirement(s) of the appropriate service provider application program to be implemented by the network routing on the behalf of the appropriate service provider application program; and the automatically establishing comprises dynamically generating the network routing configuration for the plurality of service provider application programs of the private network referencing the service registry and a configuration template.

2. The computer program product of claim 1, further comprising forwarding, by the network routing, the client request to the appropriate service provider application program after implementing the quality of service requirement(s) of the appropriate service provider application program.

3. The computer program product of claim 1, wherein the private network comprises a cloud computing environment, the network routing comprising a network routing program which references the network routing configuration, ensuring that the quality of service requirement(s) of the appropriate service provider application program is implemented with respect to the client request.

4. The computer program product of claim 1, wherein the service registry is provided on an open-source infrastructure, and the configuration template is provided by a template application, which facilitates querying the service registry and generating the network routing configuration based on the tags in the service registry associated with the plurality of service provider application programs.

5. The computer program product of claim 1, wherein the plurality of service provider application programs of the private network dynamically change over time, and the automatically establishing comprises dynamically revising the network routing configuration with one or more changes to the plurality of service provider application programs of the private network.

6. The computer program product of claim 1, wherein the one or more tags associated with the appropriate service provider application program comprise a persistent session tag, and wherein the network routing automatically adds a cookie to a response from the appropriate service provider application program to the client request being returned to a client initiating the client request, the cookie facilitating maintaining a persistent session when one or more additional client requests are received from the client for the appropriate service provider application program.

7. The computer program product of claim 1, wherein the one or more tags associated with the appropriate service provider application program comprise an authentication tag, and wherein the network routing automatically authenticates a client sending the client request before forwarding, by the network routing, the client request to the appropriate service provider application program.

8. A computer-implemented method comprising:

automatically establishing a network routing configuration for use in routing a client request from a public network to an appropriate service provider application program of a plurality of service provider application programs of a private network, the automatically establishing including generating one or more respective instructions to be executed by the network routing for the appropriate service provider application program of the plurality of service provider application programs, the one or more instructions being generated as part of the automatically establishing from one or more tags associated with the appropriate service provider application program, each tag identifying a quality of service requirement of the appropriate service provider application program to be implemented by the network routing on behalf of the appropriate service provider application program, wherein different service provider application programs of the plurality of service provider application programs of the private network have different quality of service requirements to be executed by the network routing on behalf of the different service provider application programs;

receiving the client request from the public network at the network routing;

identifying, by the network routing, the appropriate service provider application program of the plurality of service provider application programs of the private network;

based on the receiving and the identifying, executing, by the network routing, the one or more instructions associated with the appropriate service provider application program, along with routing the client request to the appropriate service provider application program, ensures that the quality of service requirement(s) of the appropriate service provider application program is implemented with respect to the client request at the network routing; and wherein:

the automatically establishing references a service registry, each instance of a service provider application program of the plurality of service provider application programs registering with the service registry when started, and the service registry including for the appropriate service provider application program, the one or more tags indicative of the quality of service requirement(s) of the appropriate service provider application program to be implemented by the network routing on the behalf of the appropriate service provider application program; and the automatically establishing comprises dynamically generating the network routing configuration for the plurality of service provider application programs of the private network referencing the service registry and a configuration template.

9. The computer-implemented method of claim 8, wherein the private network comprises a cloud computing environment, the network routing comprising a network routing program which references the network routing configuration, ensuring that the quality of service requirement(s) of the appropriate service provider application program is implemented with respect to the client request.

10. The computer-implemented method of claim 8, wherein the service registry is provided on an open-source infrastructure, and the configuration template is provided by a template application, which facilitates querying the service registry and generating the network routing configuration based on the tags in the service registry associated with the plurality of service provider application programs.

11. The computer-implemented method of claim 8, wherein the plurality of service provider application programs of the private network dynamically change over time, and the automatically establishing comprises dynamically revising the network routing configuration with one or more changes to the plurality of service provider application programs of the private network.

12. A system facilitating implementation of one or more quality of service requirements during network routing, the system comprising:

a memory; and a processor communicatively coupled to the memory, wherein the system performs a method comprising:

automatically establishing a network routing configuration for use in routing a client request from a public network to an appropriate service provider application program of a plurality of service provider application programs of a private network, the automatically establishing including generating one or more respective instructions to be executed by the network routing for the appropriate service provider application program of the plurality of service provider application programs, the one or more instructions being generated as part of the automatically establishing from one or more tags associated with the appropriate service provider application program, each tag identifying a quality of service requirement of the appropriate service provider application program to be implemented by the network routing on behalf of the appropriate service provider application program, wherein different service provider application programs of the plurality of service provider application programs of the private network have different quality of service requirements to be executed by the network routing on behalf of the different service provider application programs;

receiving the client request from the public network at the network routing;

identifying, by the network routing, the appropriate service provider application program of the plurality of service provider application programs of the private network;

based on the receiving and the identifying, executing, by the network routing, the one or more instructions associated with the appropriate service provider application program, along with routing the client request to the appropriate service provider application program, ensures that the quality of service requirement(s) of the appropriate service provider application program is implemented with respect to the client request at the network routing; and wherein:

the automatically establishing references a service registry, each instance of a service provider application program of the plurality of service provider application programs registering with the service registry when started, and the service registry including for the appropriate service provider application program, the one or more tags indicative of the quality of service requirement(s) of the appropriate service provider application program to be implemented by the network routing on the behalf of the appropriate service provider application program; and the automatically establishing comprises dynamically generating the network routing configuration for the plurality of service provider application programs of the private network referencing the service registry and a configuration template.

13. The system of claim 12, wherein the private network comprises a cloud computing environment, the network routing comprising a network routing program which references the network routing configuration, ensuring that the quality of service requirement(s) of the appropriate service provider application program is implemented with respect to the client request.

14. The system of claim 12, wherein the plurality of service provider application programs of the private network dynamically change over time, and the automatically establishing comprises dynamically revising the network routing configuration with one or more changes to the plurality of service provider application programs of the private network.

* * * * *